United States Patent
Matsunawa

(10) Patent No.: US 11,901,780 B2
(45) Date of Patent: Feb. 13, 2024

(54) RESOLVER

(71) Applicant: MABUCHI MOTOR CO., LTD., Chiba (JP)

(72) Inventor: Akira Matsunawa, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/256,208

(22) PCT Filed: Dec. 10, 2021

(86) PCT No.: PCT/JP2021/045683
§ 371 (c)(1),
(2) Date: Jun. 7, 2023

(87) PCT Pub. No.: WO2022/124411
PCT Pub. Date: Jun. 16, 2022

(65) Prior Publication Data
US 2023/0344327 A1    Oct. 26, 2023

(30) Foreign Application Priority Data
Dec. 11, 2020   (JP) .................................. 2020-205911

(51) Int. Cl.
*H02K 24/00*    (2006.01)
*H02K 11/30*    (2016.01)
*H02K 11/33*    (2016.01)

(52) U.S. Cl.
CPC ............. *H02K 24/00* (2013.01); *H02K 11/30* (2016.01); *H02K 11/33* (2016.01)

(58) Field of Classification Search
CPC ......... H02K 11/30; H02K 11/33; H02K 24/00
(Continued)

(56) References Cited

U.S. PATENT DOCUMENTS

| 4,755,751 A | * | 7/1988 | Ray | ...................... H02K 24/00 |
| | | | | 318/661 |
| 5,705,871 A | * | 1/1998 | Suzuki | ................. G01D 5/2492 |
| | | | | 310/68 B |

(Continued)

FOREIGN PATENT DOCUMENTS

| CN | 102223046 A | 10/2011 |
| CN | 110506196 A | 11/2019 |

(Continued)

OTHER PUBLICATIONS

International Search Report in PCT Application No. PCT/JP2021/045683 dated Mar. 1, 2022, 5pp.
(Continued)

*Primary Examiner* — Rashad H Johnson
(74) *Attorney, Agent, or Firm* — HAUPTMAN HAM, LLP

(57) ABSTRACT

A resolver includes a first coil group and a second coil group. The first coil group has a first exciting coil and a first detecting coil that have a multiplication factor of angle of nX (where n is a natural number equal to or greater than three), are placed coaxially with the axis of rotation of the rotor, and each have a ring shape. The second coil group has a second exciting coil and a second detecting coil that have a multiplication factor of angle of (n−1)x, are placed coaxially with the axis of rotation of the rotor, and each have a ring shape. Furthermore, the first coil group and the second coil group are provided at positions different in a radial direction from each other.

7 Claims, 6 Drawing Sheets

(58) Field of Classification Search
USPC .................................................. 310/68 B, 71
See application file for complete search history.

(56) References Cited

U.S. PATENT DOCUMENTS

| | | | | |
|---|---|---|---|---|
| 2002/0078764 A1* | 6/2002 | Jin | ....................... | G01D 5/2013 |
| | | | | 73/862.331 |
| 2004/0085063 A1* | 5/2004 | Jin | ........................ | G01D 5/202 |
| | | | | 324/207.16 |
| 2005/0057245 A1 | 3/2005 | Miya | | |
| 2009/0315544 A1* | 12/2009 | Takahashi | ............... | G01P 3/446 |
| | | | | 702/155 |
| 2012/0139533 A1* | 6/2012 | Manabe | ............. | G01D 5/24419 |
| | | | | 324/207.25 |
| 2012/0153763 A1* | 6/2012 | Kenji | .................... | H02K 21/042 |
| | | | | 310/156.43 |
| 2013/0113471 A1* | 5/2013 | Ura | .......................... | G01D 5/20 |
| | | | | 324/207.25 |
| 2013/0261990 A1* | 10/2013 | Ura | ........................... | G01B 7/30 |
| | | | | 702/41 |
| 2014/0002001 A1* | 1/2014 | Kinashi | ................ | H02K 11/225 |
| | | | | 318/724 |
| 2014/0197716 A1* | 7/2014 | Shiina | .................... | H02K 16/02 |
| | | | | 310/68 B |
| 2017/0167895 A1* | 6/2017 | Ochiai | .................. | G01D 5/2033 |
| 2017/0288510 A1* | 10/2017 | Takiguchi | ............. | G01D 5/2046 |
| 2018/0154926 A1* | 6/2018 | Ohira | .................... | B62D 15/02 |
| 2018/0306604 A1* | 10/2018 | Lee | ........................ | G01D 5/245 |
| 2019/0033098 A1* | 1/2019 | Yamamoto | ............. | G01D 5/204 |
| 2019/0044418 A1* | 2/2019 | Matsunawa | .......... | H02K 11/225 |
| 2019/0186891 A1* | 6/2019 | Utermoehlen | ....... | G01D 5/2053 |
| 2020/0003585 A1 | 1/2020 | Narita | | |
| 2020/0266686 A1* | 8/2020 | Mori | ........................ | H02K 1/16 |
| 2021/0028677 A1* | 1/2021 | Fujino | .................... | H02K 21/24 |
| 2021/0131830 A1* | 5/2021 | Ando | ........................ | G01B 7/30 |
| 2022/0194210 A1* | 6/2022 | Takahashi | .............. | H02K 7/085 |
| 2022/0263396 A1* | 8/2022 | Takahashi | ................ | H02K 3/47 |
| 2022/0276073 A1* | 9/2022 | Kinashi | .................... | G01D 5/20 |
| 2022/0376596 A1* | 11/2022 | Yamamoto | ............. | F04D 25/06 |
| 2023/0013379 A1* | 1/2023 | Ikeda | .................... | B62D 5/046 |
| 2023/0150571 A1* | 5/2023 | Shirakawa | ............ | G01D 5/202 |
| | | | | 180/443 |

FOREIGN PATENT DOCUMENTS

| | | |
|---|---|---|
| EP | 3611476 A1 | 2/2020 |
| GB | 2520896 A | 6/2015 |
| JP | 2001183169 A | 7/2001 |
| JP | 4418475 B2 | 2/2010 |
| JP | 2011226874 A | 11/2011 |
| WO | 2014037024 A1 | 3/2014 |
| WO | 2018190019 A1 | 10/2018 |

OTHER PUBLICATIONS

Written Opinion in PCT Application No. PCT/JP2021/045683 dated Mar. 1, 2022, 5pp.
Office Action in CN Application No. 202180082221.6, dated Oct. 11, 2023, 23pp.

* cited by examiner

RESOLVER

RELATED APPLICATIONS

The present application is a National Phase of International Application Number PCT/JP2021/045683 filed Dec. 10, 2021, which claims the benefit of priority from Japanese Patent Application No. 2020-205911, filed on Dec. 11, 2020.

TECHNICAL FIELD

The present invention relates to a resolver that detects the angle of rotation of a rotor relative to a stator.

BACKGROUND ART

A technology is conventionally known in which a resolver that detects the angle of rotation of a rotor relative to a stator uses a plurality of multiplication factors of angle. For example, when the multiplication factor of angle is set at 1×, one rotation of the rotor corresponds to one cycle of an output signal, which facilitates determining the absolute angle. On the other hand, when the multiplication factor of angle is set at n× greater than 1×, a change in the output signal in response to a change in the angle of rotation of the rotor increases, and the angular resolution increases. Therefore, a combined use of a coil having the multiplication factor of angle of 1X and a coil having the multiplication factor of angle of n× can increase the capability of detecting the angle of rotation. Note that a resolver that detects the angle of rotation by use of a plurality of multiplication factors of angle is also called a multi-speed resolver (refer to Japanese Patent No. 4418475).

CITATION LIST

Patent Literature

Patent Literature 1: Japanese Patent No. 4418475

DISCLOSURE OF THE INVENTION

Problems to be Solved by the Invention

A coil having a multiplication factor of angle of 1× has a relatively large coil area compared to a coil having a multiplication factor of angle of n×, and has a property of being susceptible to an external magnetic field. Hence, the capability of detecting the angle of rotation may decrease depending on the strength of the external magnetic field. Moreover, an optimal value for an air gap (a distance between a coil in a stator and a coil in a rotor placed facing the coil in the stator) is different between the coil having the multiplication factor of angle of 1× and the coil having the multiplication factor of angle of n×. Hence, there is also a problem that it is difficult to set an air gap appropriate for each coil and to optimize the distribution of magnetic field strength.

One object of the invention has been devised in view of the above problem, and is to provide a resolver that is designed to be able to improve the capability of detecting the angle of rotation with a simple configuration. Note that the invention is not limited to this object, and exerting operations and effects derived from configurations revealed in "DESCRIPTION OF PREFERRED EMBODIMENTS" described below, the operations and effects being unattainable by the known technology, is also another object of the invention.

Solutions to the Problems

A resolver of the disclosure is a resolver that detects the angle of rotation of a rotor relative to a stator, and includes: a first coil group having a first exciting coil and a first detecting coil that have a multiplication factor of angle of n×(where n is a natural number equal to or greater than three), are placed coaxially with the axis of rotation of the rotor, and each have a ring shape; and a second coil group having a second exciting coil and a second detecting coil that have a multiplication factor of angle of (n−1)×, are placed coaxially with the axis of rotation of the rotor, and each have a ring shape. Moreover, the first coil group and the second coil group are provided at positions different in a radial direction from each other.

Effects of the Invention

According to a resolver of the disclosure, it is possible to improve the capability of detecting the angle of rotation with a simple configuration.

DESCRIPTION OF PREFERRED EMBODIMENTS

1. First Embodiment

[A. Configuration]

Figure 1:
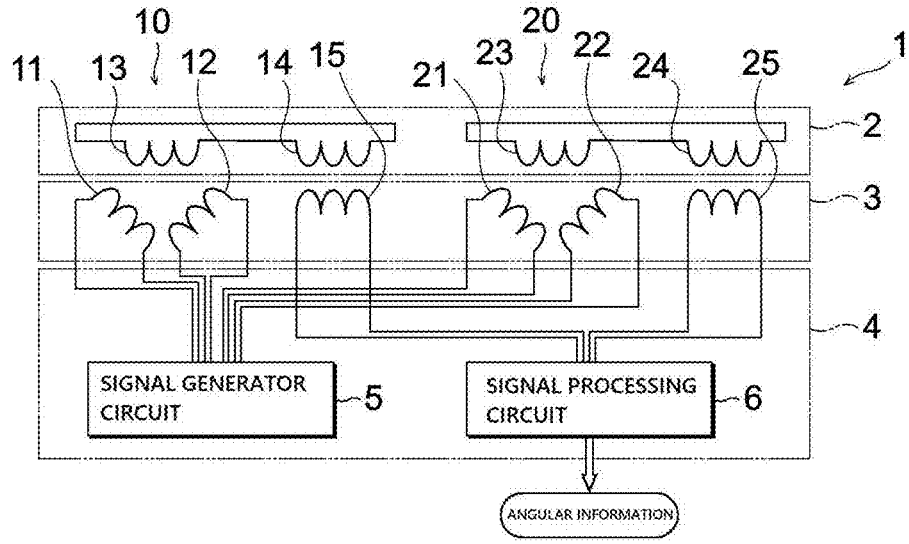
FIG. 1 is a schematic diagram illustrating the structure of a resolver as a first embodiment.

FIG. 1 is a schematic diagram illustrating the structure of a resolver 1 as a first embodiment. The resolver 1 is the two-phase excitation/single-phase output resolver 1, and is a modulated wave resolver that inputs an amplitude modulated alternating current signal and detects the angle of rotation from a signal of which the phase has been modulated by use of the alternating current signal. Moreover, the resolver 1 includes a rotor 2 (a rotor), a stator 3 (a stator), and a control device 4. The rotor 2 is a disc-shaped member that is pivotally supported in such a manner as to be rotatable relative to the stator 3. Moreover, the stator 3 is a disc-shaped member that is fixed to an unillustrated casing. Each of the rotor 2 and the stator 3 is provided with a plurality of sheet coils.

The control device 4 computes and outputs the angle of rotation of the rotor 2 relative to the stator 3. A signal generator circuit 5 that generates alternating current signals that are supplied to the sheet coils, and a signal processing circuit 6 that outputs angular information corresponding to the angle of rotation on the basis of the alternating current signals returned from the sheet coils are incorporated in the control device 4. It is configured in such a manner that the alternating current signals generated in the signal generator circuit 5 are transmitted by electromagnetic induction from the stator 3 to the rotor 2 and then returned from the rotor 2 to the stator 3 to be inputted into the signal processing circuit 6.

The rotor 2 and the stator 3 of the resolver 1 illustrated in FIG. 1 are provided with a first coil group 10 and a second coil group 20. The first coil group 10 is a coil group including exciting and detecting coils having a multiplication factor of angle of n×(where n is a natural number equal to or greater than three). In other words, the exciting and detecting coils of the first coil group 10 are multipole coils, and each include n magnetic pole pairs (the north and south poles). Moreover, the exciting and detecting coils of the first coil group 10 are placed coaxially with the axis of rotation of the rotor 2, and are each formed in a ring shape. Note that current flowing through the coils of the resolver 1 is alternating current and therefore the polarities (the north and south poles) of the magnetic pole pairs are reversed with a frequency in accordance with the frequency of the alternating current. Therefore, the polarities of the magnetic pole pairs are not always fixed. In other words, portions that function as the north poles and portions that function as the south poles coexist at a certain moment, and the polarity of each portion changes with time.

Contrarily, the second coil group 20 is a coil group including exciting and detecting coils having a multiplication factor of angle of (n−1)×. The exciting and detecting coils of the second coil group 20 are placed coaxially with the axis of rotation of the rotor 2, and are each formed in a ring shape. The first coil group 10 and the second coil group 20 are provided at positions that are different in the radial direction from each other. The exciting and detecting coils of the second coil group 20 are also multipole coils, but the number of magnetic pole pairs (the north and south poles) is n−1. In this manner, the exciting and detecting coils of the second coil group 20 have a feature of having a multiplication factor of angle that is smaller by 1× than the exciting and detecting coils of the first coil group 10, and is less by one in the number of magnetic pole pairs. The value of n representing the multiplication factor of angle is simply required to be any natural number equal to or greater than three. As the value of n increases, the angular resolution increases.

The first coil group 10 includes a first sine exciting coil 11, a first cosine exciting coil 12, a first detecting coil 13, a first transmission antenna coil 14, and a first receiving antenna coil 15. The multiplication factor of angle of at least the first sine exciting coil 11, the first cosine exciting coil 12, and the first detecting coil 13 among the coils 11 to 15 is set at n×. As illustrated in FIG. 1, the first sine exciting coil 11, the first cosine exciting coil 12, and the first receiving antenna coil 15 are provided to the stator 3. Moreover, the first detecting coil 13 and the first transmission antenna coil 14 are provided to the rotor 2.

The first sine exciting coil 11 and the first cosine exciting coil 12 are sheet-shaped coils for inducing a voltage (a voltage responsive to the angle of the rotor) in the first detecting coil 13 of the rotor 2. When there is no need to distinguish them, there is no problem in that they are collectively referred to as the first exciting coils 11 and 12. Alternating current signals that are 90 electrical degrees apart in phase are inputted into the first exciting coils 11 and 12. The alternating current signals are generated in the signal generator circuit 5 and then supplied to the first sine exciting coil 11 and the first cosine exciting coil 12. Specific examples of the alternating current signal include a modulated wave obtained by being modulated in such a manner as to periodically vary the amplitude of a high-frequency signal at, for example, several dozen kilohertz to several megahertz.

Figure 2:
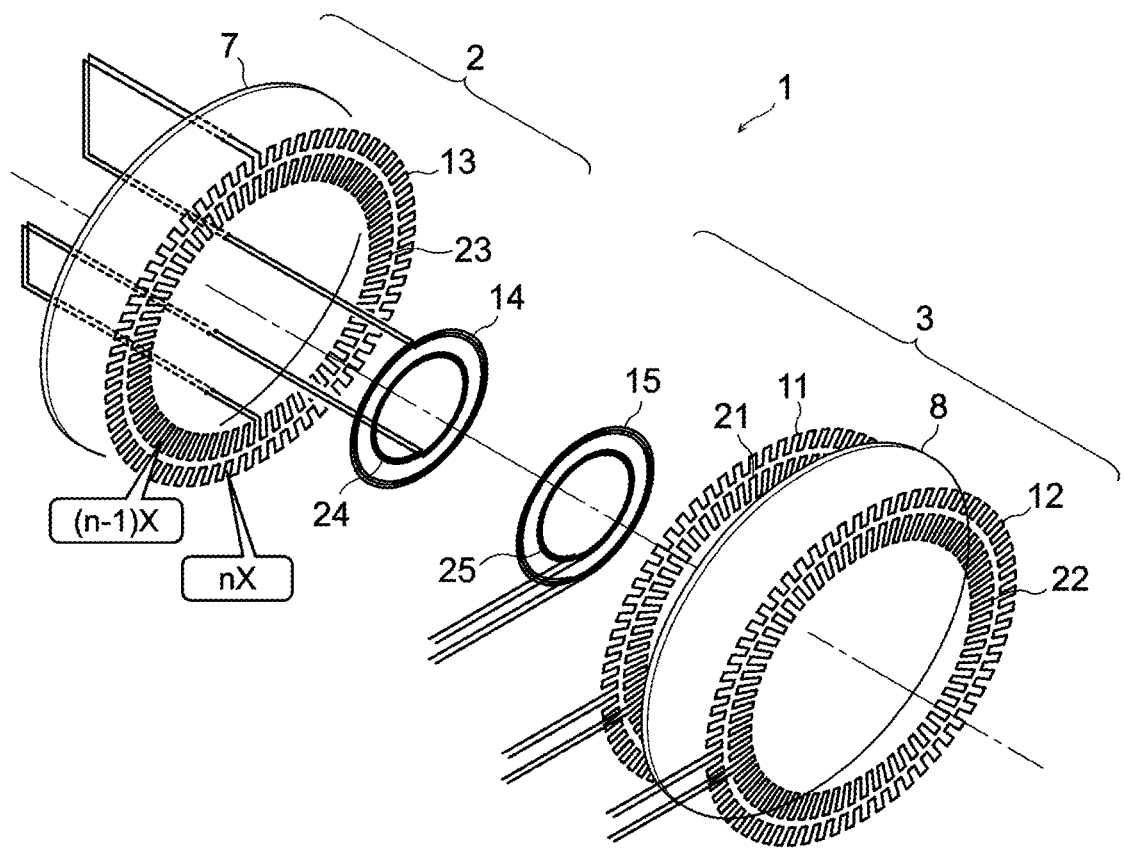
FIG. 2 is an exploded perspective view illustrating the main elements of the resolver illustrated in FIG. 1.

The first sine exciting coil 11 is formed in, for example, a closed circuit shape where an outward coil for generating one of the paired magnetic poles (the north and south poles) and a return coil for generating the other of the paired magnetic poles are connected. Each of the outward and return coils is formed in, for example, a shape obtained by placing a rectangular wave along the circumference of a circle coaxial with the center of rotation of the rotor 2. In other words, each of the outward and return coils is formed in a shape obtained by routing a conductor in such a manner as to form the outline of a gear placed coaxially with the center of rotation of the rotor 2. Therefore, the n magnetic pole pairs are alternately placed in the circumference in the first sine exciting coil 11. FIG. 2 is an exploded perspective view simply illustrating the disassembled main structure of the resolver 1. In this example, the first sine exciting coil 11 is formed on one side surface of an insulating base 8. The outward and return coils may be placed on top of each other in two layers on one side surface of the base 8, or may be placed separately on two side surfaces of the base 8.

The same applies to the first cosine exciting coil 12. For example, the first cosine exciting coil 12 is formed in, for example, a shape obtained by placing a rectangular wave along the circumference of a circle coaxial with the center of rotation of the rotor 2. The n magnetic pole pairs are alternately placed in the circumference also in the first cosine exciting coil 12. In the example illustrated in FIG. 2, the first cosine exciting coil 12 is formed on the other side surface of the insulating base 8. Note that the first sine exciting coil 11 and the first cosine exciting coil 12 may be placed on top of each other on one side surface of the base 8, or the positional relationship between the first sine exciting coil 11 and the first cosine exciting coil 12 may be opposite.

The first detecting coil 13 is placed at a position facing the first sine exciting coil 11 and the first cosine exciting coil 12 in an axial direction of the rotor 2. The first detecting coil 13 is formed in a sheet shape as in the first sine exciting coil 11 and the first cosine exciting coil 12, and is formed in, for example, a shape obtained by placing a rectangular wave along the circumference of a circle coaxial with the center of rotation of the rotor 2. A voltage is induced, to the first detecting coil 13, by interlinkage of magnetic flux generated by exciting the first sine exciting coil 11 and the first cosine exciting coil 12. In the example illustrated in FIG. 2, the first detecting coil 13 is formed on one side surface of an insulating base 7. An alternating current signal responsive to the angle of rotation of the rotor 2 relative to the stator 3 is generated by electromagnetic induction in the first detecting coil 13.

The first transmission antenna coil 14 is a winding (coil) that is excited by a voltage induced in the first detecting coil 13, and is provided to the rotor 2. As illustrated in FIG. 1, two ends of the first transmission antenna coil 14 are connected to two ends of the first detecting coil 13 to form a closed circuit. The first transmission antenna coil 14 illustrated in FIG. 2 is formed inside the first detecting coil 13, in a shape obtained by routing a conductor in such a manner as to spirally turn around the center of rotation of the rotor 2. Note that as illustrated in FIG. 2, wires extended from ends of the first detecting coil 13 and the first transmission antenna coil 14 may be caused to penetrate the base 7 and connected on the other side surface of the base 7.

The first receiving antenna coil 15 is provided to the stator 3, and is placed at a position facing the first transmission antenna coil 14 in the axial direction of the rotor 2. A voltage is induced in the first receiving antenna coil 15 by interlinkage of magnetic flux generated by exciting the first transmission antenna coil 14. The first receiving antenna coil 15 illustrated in FIG. 2 is formed on the one side surface of the base 8, and is formed inside the first sine exciting coil 11, in a shape obtained by routing a conductor in such a manner as to spirally turn around the center of rotation of the rotor 2. An alternating current signal transmitted to the first receiving antenna coil 15 is inputted into the signal processing circuit 6, and is used to compute the angle of rotation of the rotor 2 relative to the stator 3.

The configuration of the second coil group 20 is substantially similar to that of the first coil group 10 except for a feature related to the multiplication factor of angle. The second coil group 20 includes a second sine exciting coil 21, a second cosine exciting coil 22, a second detecting coil 23, a second transmission antennal coil 24, and a second receiving antenna coil 25. Among the coils 21 to 25, the multiplication factor of angle of at least the second sine exciting coil 21, the second cosine exciting coil 22, and the second detecting coil 23 is set at (n−1)×. As illustrated in FIG. 1, the second sine exciting coil 21, the second cosine exciting coil 22, and the second receiving antenna coil 25 are provided to the stator 3. Moreover, the second detecting coil 23 and the second transmission antenna coil 24 are provided to the rotor 2.

The second sine exciting coil 21 and the second cosine exciting coil 22 are sheet-shaped coils for inducing a voltage (a voltage responsive to the angle of the rotor) in the second detecting coil 23 of the rotor 2. When there is no need to distinguish them, there is no problem in that they are collectively referred to as the second exciting coils 21 and 22. Alternating current signals that are 90 electrical degrees apart in phase (the alternating current signals generated in the signal generator circuit 5) are inputted into the second exciting coils 21 and 22, as in the first exciting coils 11 and 12.

The second sine exciting coil 21 is formed in a sheet shape inside the first sine exciting coil 11, and is formed in, for example, a closed circuit shape where an outward coil for generating one of the paired magnetic poles (the north and south poles) and a return coil for generating the other of the paired magnetic poles are connected. Each of the outward and return coils is formed in, for example, a shape obtained by placing a rectangular wave along the circumference of a circle coaxial with the center of rotation of the rotor 2. Moreover, the second cosine exciting coil 22 is formed in a sheet shape inside the first cosine exciting coil 12, and is formed in, for example, a closed circuit shape where an outward coil for generating one of the paired magnetic poles (the north and south poles) and a return coil for generating the other of the paired magnetic poles are connected. In the second exciting coils 21 and 22, n−1 north poles and n−1 south poles are alternately placed in the circumferential direction.

The second detecting coil 23 is placed at a position facing the second sine exciting coil 21 and the second cosine exciting coil 22 in the axial direction of the rotor 2. The second detecting coil 23 is formed in a sheet shape inside the first detecting coil 13, and is formed in, for example, a shape obtained by placing a rectangular wave along the circumference of a circle coaxial with the center of rotation of the rotor 2. n−1 north poles and n−1 south poles are alternately placed in the circumferential direction also in the second detecting coil 23.

The second transmission antenna coil 24 is a winding (coil) that is excited by a voltage induced in the second detecting coil 23, and is provided to the rotor 2. As illustrated in FIG. 1, two ends of the second transmission antenna coil 24 are connected to two ends of the second detecting coil 23 to form a closed circuit. The second transmission antenna coil 24 illustrated in FIG. 2 is formed inside the second detecting coil 23, in a shape obtained by routing a conductor in such a manner as to spirally turn around the center of rotation of the rotor 2.

The second receiving antenna coil 25 is provided to the stator 3, and is placed at a position facing the second transmission antenna coil 24 in the axial direction of the rotor 2. A voltage is induced in the second receiving antenna coil 25 by interlinkage of magnetic flux generated by exciting the second transmission antenna coil 24. The second receiving antenna coil 25 illustrated in FIG. 2 is formed inside the second sine exciting coil 21, in a shape obtained by routing a conductor in such a manner as to spirally turn around the center of rotation of the rotor 2. An alternating current signal transmitted to the second receiving antenna coil 25 is inputted into the signal processing circuit 6, and is used to compute the angle of rotation of the rotor 2 relative to the stator 3.

The signal processing circuit 6 has a function of calculating the angle of rotation (the absolute angle) of the rotor 2 relative to the stator 3 on the basis of the alternating current signal transmitted to the first receiving antenna coil 15 and the alternating current signal transmitted to the second receiving antenna coil 25. The former alternating current signal is a signal transmitted via the coils 11 to 13 having the multiplication factor of angle of n×. The latter alternating current signal is a signal transmitted via the coils 21 to 23 having the multiplication factor of angle of (n−1)×.

In this manner, alternating current signals obtained via the coils of the two systems that are different in the multiplication factor of angle by 1× are used in combination. Consequently, a phase difference between the former alternating current signal and the latter alternating current signal corresponds one-to-one to the absolute angle of the rotor 2. Therefore, the absolute angle of the rotor 2 can be detected with high accuracy on the basis of the phase difference between the alternating current signals. This detection principle is known as the vernier principle (the vernier caliper measurement principle) (refer to, for example, WO 2015/037491 A and EP 1,353,151 B).

Figure 3:
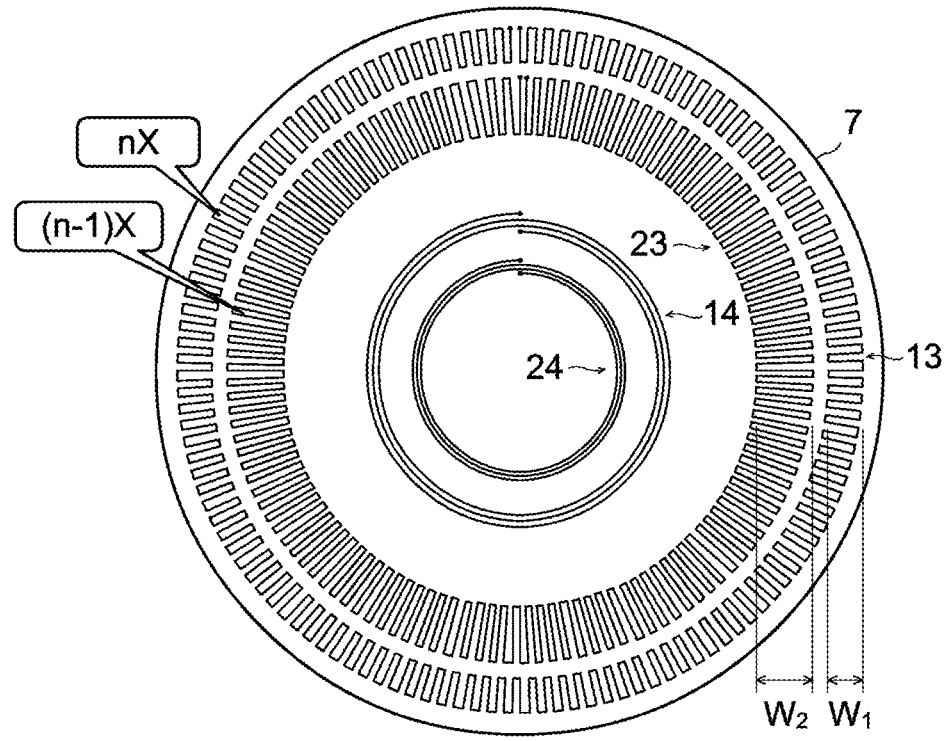
FIG. 3 is a front view of a rotor illustrated in FIG. 1.

FIG. 3 is a front view of the rotor 2. The second detecting coil 23 included in the second coil group 20 is placed inside the first detecting coil 13 included in the first coil group 10. Moreover, as illustrated in FIG. 2, the same applies to the exciting coils 11, 12, 21, and 22. In other words, the second sine exciting coil 21 included in the second coil group 20 is placed inside the first sine exciting coil 11 included in the first coil group 10, and the second cosine exciting coil 22 included in the second coil group 20 is placed inside the first cosine exciting coil 12 included in the first coil group 10. In this manner, the coils having fewer magnetic pole pairs are placed on the inner sides to facilitate securing the dimension of a magnetic pole (the width of a magnetic pole) in the circumferential direction as compared to a case where the coils having more magnetic pole pairs are placed on the inner sides.

The first detecting coil 13 illustrated in FIG. 3 is placed in an annular area coaxial with the center of rotation of the rotor 2. Let the radial dimension of the area be $W_1$. On the other hand, let the radial dimension of an annular area where the second detecting coil 23 is placed be $W_2$. $W_2$ is set to be greater in dimension than $W_1$. In other words, the radial dimension $W_2$ of the second detecting coil 23 placed on the inner side is set to be greater than the radial dimension $W_1$ of the first detecting coil 13 placed outward of the second detecting coil 23.

The same applies to the exciting coils 11, 12, 21, and 22. The radial dimension of the second sine exciting coil 21 placed on the inner side is set to be greater than the radial dimension of the first sine exciting coil 11 placed outward of the second sine exciting coil 21. Moreover, the radial dimension of the second cosine exciting coil 22 placed on the inner side is set to be greater than the radial dimension of the first cosine exciting coil 12 placed outward of the second cosine exciting coil 22. In this manner, the radial dimension of the coil placed on the inner side is increased to facilitate securing the area of one magnetic pole.

[B. Operations and Effects]

(1) The above resolver 1 is provided with the first coil group 10 and the second coil group 20. The first coil group 10 has the multiplication factor of angle of n×(where n is a natural number equal to or greater than three), is placed facing each other in the rotor 2 and the stator 3, and is placed coaxially with the axis of rotation of the rotor 2, and also includes the first exciting coils 11 and 12 (the first sine exciting coil 11 and the first cosine exciting coil 12) and the first detecting coil 13, each of which is formed in a ring shape. Moreover, the second coil group 20 has the multiplication factor of angle of (n−1)×, is placed facing each other in the rotor 2 and the stator 3, and is placed coaxially with the axis of rotation of the rotor 2, and also includes the second exciting coils 21 and 22 (the second sine exciting coil 21 and the second cosine exciting coil 22) and the second detecting coil 23, each of which is formed in a ring shape. The first coil group 10 and the second coil group 20 are provided at the positions that are different in the radial direction from each other.

With such a configuration, alternating current signals obtained via the coils of the two systems that are different in the multiplication factor of angle by 1× can be acquired, and information on the phase difference can be caused to correspond one-to-one to the absolute angle of the rotor 72. Therefore, with a simple configuration, the capability of detecting the angle of rotation can be improved by use of the vernier principle. Moreover, multi-pole coils are used instead of coils having a multiplication factor of angle of 1×, which makes it possible to be resistant to the influence of an external magnetic field. Consequently, it is possible to increase immunity to magnetic noise and prevent an increase in detection error.

Moreover, the first coil group 10 and the second coil group 20 are provided at the positions that are different in the radial direction from each other. As a result, they can be placed in the same planes. For example, as illustrated in FIG. 2, the first sine exciting coil 11 and the second sine exciting coil 21 can be placed in the same plane. Moreover, the first cosine exciting coil 12 and the second cosine exciting coil 22 can be placed in the same plane. In addition, the first detecting coil 13 and the second detecting coil 23 can be placed in the same plane. Therefore, the structures of the rotor 2 and the stator 3 can be simplified. The first coil group 10 and the second coil group 20 can have the same signal strength, and the angle detection accuracy of the resolver 1 can be increased.

Furthermore, a magnetic pole size difference can be reduced as compared to a case where a coil having the multiplication factor of angle of n× and a coil having the multiplication factor of angle of 1× are used. Consequently, the distribution of the magnetic field strength can be made substantially uniform. Note that an air gap appropriate for a coil having the multiplication factor of angle of n× is close in value to an air gap appropriate for a coil having the multiplication factor of angle of (n−1)×. Therefore, the air gap of the first coil group 10 and the air gap of the second coil group 20 can have the same value, and the distribution of the magnetic field strength can be easily optimized.

(2) In the above resolver 1, each of the first coil group 10 and the second coil group 20 is formed in a sheet shape. For example, the first exciting coils 11 and 12 are formed in a sheet shape, and the first detecting coil 13 is also formed in a sheet shape. Similarly, the second exciting coils 21 and 22 are formed in a sheet shape, and the second detecting coil 23 is also formed in a sheet shape. Moreover, the second coil group 20 is placed radially inward of the first coil group 10. For example, as illustrated in FIG. 2, the second exciting coils 21 and 22 are placed inside the first exciting coils 11 and 12, and the second detecting coil 23 is placed inside the first detecting coil 13. In this manner, the coils 21 to 23 having a fewer magnetic pole pairs are placed on the inner side to enable securing the dimension of a magnetic pole (the width of a magnetic pole) in the circumferential direction as compared to the case where the coils 11 to 13 having more magnetic pole pairs are placed on the inner sides. Therefore, the capability of detecting the angle of rotation can be improved. Moreover, the use of sheet-shaped coils enables reducing the thickness dimensions of the rotor 2 and the stator 3 and promoting reductions in the size and weight of the resolver 1.

(3) In the above resolver 1, the radial dimension of the area where the second coil group 20 is placed is greater than the radial dimension of the area where the first coil group 10 is placed. For example, as illustrated in FIG. 3, the radial dimension $W_2$ of the second detecting coil 23 is set to be greater than the radial dimension $W_1$ of the first detecting coil 13. Similarly, the radial dimensions of the second exciting coils 21 and 22 are also set to be greater than the radial dimensions of the first exciting coils 11 and 12. In this manner, the area of one magnetic pole can be secured by increasing the radial dimensions of the coils 21 to 23 placed on the inner side. Therefore, the distribution of magnetic field strength can be optimized, and the capability of detecting the angle of rotation can be improved.

(4) The first coil group 10 of the above resolver 1 includes the first sine exciting coil 11, the first cosine exciting coil 12, and the first detecting coil 13. Similarly, the second coil group 20 includes the second sine exciting coil 21, the second cosine exciting coil 22, and the second detecting coil 23. The sine exciting coils 11 and 21 are provided to the stator 3, and are excited by a first signal corresponding to an amplitude modulated sine wave. Moreover, the cosine exciting coils 12 and 22 are provided to the stator 3, and are excited by a second signal (a signal orthogonal to the first signal) corresponding to an amplitude modulated cosine wave. Furthermore, the detecting coils 13 and 23 are provided to the rotor 2, and output a modulated wave including a phase shift responsive to the angle of rotation of the rotor 2 relative to the stator 3. With such a configuration, the capability of detecting the angle of rotation of the two-phase excitation/single-phase output modulated wave resolver 1 can be improved. Moreover, the features of the modulated wave resolver 1 enable ensuring desired angle detection accuracy while reducing the turns of a coil significantly.

[C. Modifications]

The above first embodiment is a mere example. It is not intended to exclude the application of various modifications and technologies that are not specified in the embodiment. The configurations of the embodiment can be modified in various manners without departing from the gist thereof and carried out. Moreover, the configurations of the embodiment can be selected as necessary, or combined as appropriate. For example, in the above embodiment, the exciting coils and the detecting coils are multi-pole sheet coils and are excited. However, winding coils may be applied instead of the sheet coils.

Figure 4:
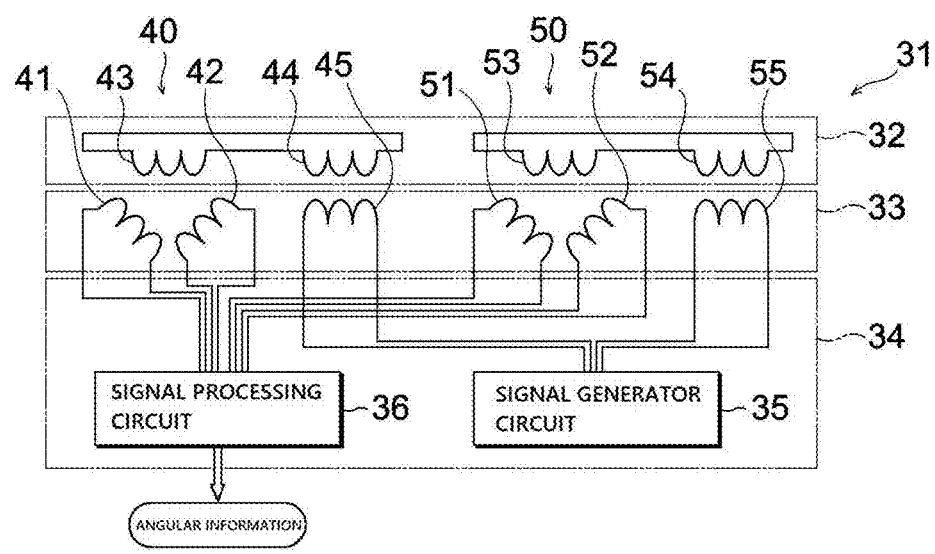
FIG. 4 is a schematic diagram illustrating the structure of a resolver as a modification.

Moreover, in the above embodiment, the two-phase excitation/single-output resolver 1 is illustrated by example. However, a similar structure may be applied to such a single-phase excitation/two-phase output resolver 31 illustrated in FIG. 4. The resolver 31 is provided with a rotor 32, a stator 33, and a control device 34. A signal generator circuit 35 and a signal processing circuit 36 are incorporated in the control device 34. Moreover, the rotor 32 and the stator 33 of the resolver 31 are provided with a first coil group 40 and a second coil group 50.

The first coil group 40 includes a first sine detecting coil 41, a first cosine detecting coil 42, a first exciting coil 43, a first receiving antenna coil 44, and a first transmission antenna coil 45. Similarly, the second coil group 50 includes a second sine detecting coil 51, a second cosine detecting coil 52, a second exciting coil 53, a second receiving antenna coil 54, and a second transmission antenna coil 55. The multiplication factor of angle of the first sine detecting coil 41, the first cosine detecting coil 42, and the first exciting coil 43 among the coils included in the coil groups 40 and 50 is set at n×, and the multiplication factor of angle of the second sine detecting coil 51, the second cosine detecting coil 52, and the second exciting coil 53 is set at (n−1)×.

Moreover, the first exciting coil 43, the first receiving antenna coil 44, the second exciting coil 53, and the second receiving antenna coil 54 are provided to the rotor 32. On the other hand, the first sine detecting coil 41, the first cosine detecting coil 42, the first transmission antenna coil 45, the second sine detecting coil 51, the second cosine detecting coil 52, and the second transmission antenna coil 55 are provided to the stator 33.

Alternating current signals generated in the signal generator circuit 35 are transmitted to the first transmission antenna coil 45 and the second transmission antenna coil 55, and then to the first receiving antenna coil 44 and the second receiving antenna coil 54. The first exciting coil 43 and the second exciting coil 53 are excited in response to the alternating current signals. The first sine detecting coil 41, the first cosine detecting coil 42, the second sine detecting coil 51, and the second cosine detecting coil 52 subsequently output alternating current signals responsive to the angle of rotation of the rotor 32 relative to the stator 33, and the signals are transmitted to the signal processing circuit 36.

The signal processing circuit 36 calculates the angle of rotation of the rotor 32 relative to the stator 33 by a combined use of the alternating current signals obtained via the coils of the two systems that are different in the multiplication factor of angle by 1×, and outputs the angular information. In this manner, also in the single-phase excitation/two-phase output resolver 31, the capability of detecting the angle of rotation can be improved with a simple configuration by use of the vernier principle. Note that a similar structure to that of the above embodiment can be applied to not only the single-phase excitation/two-phase output resolver 31 but also a two-phase excitation/two-phase output resolver.

Figure 5:
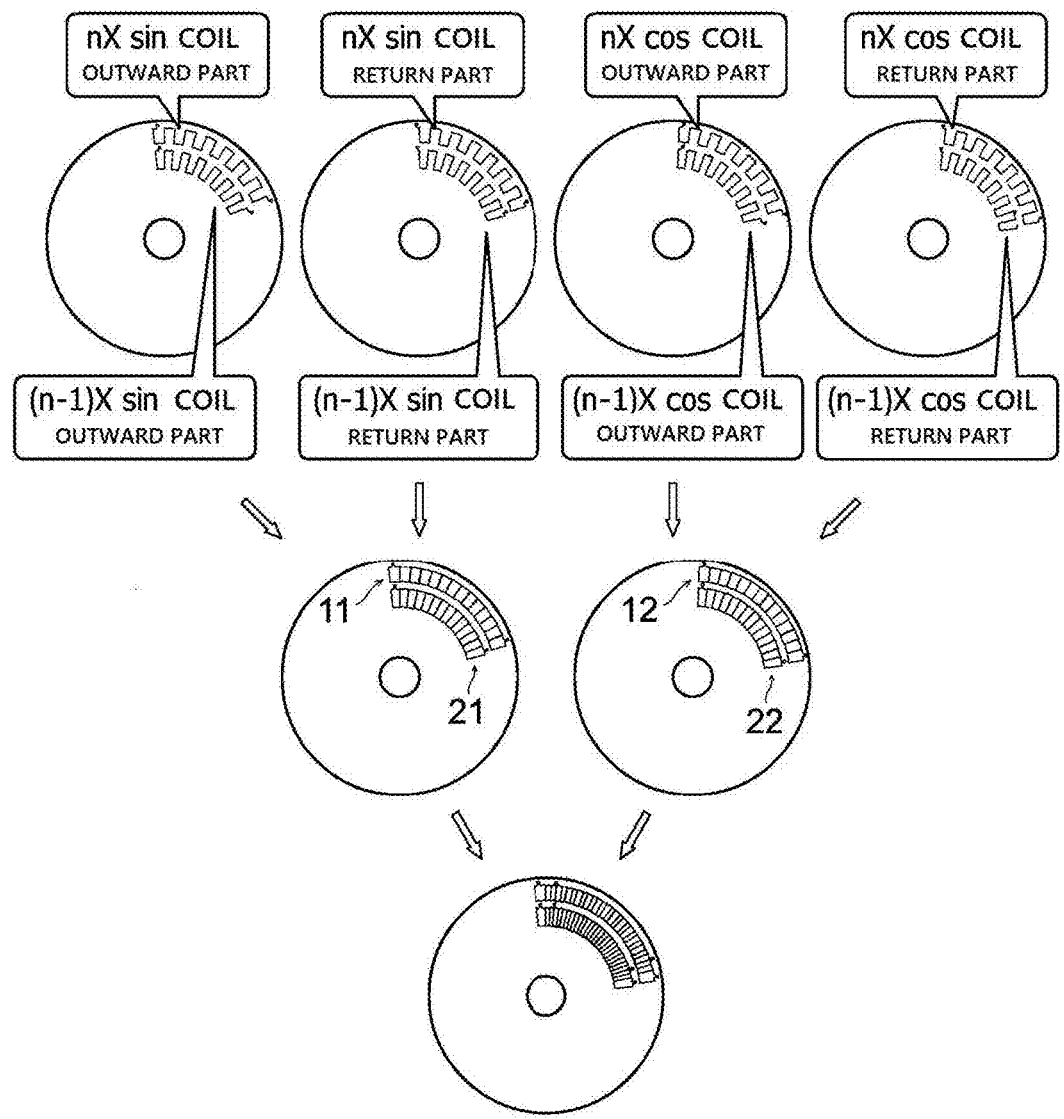
FIG. 5 is a front view of a stator illustrative of a coil shape as a modification.

In the above embodiment, the exciting coils and the detecting coils of the first coil group 10 and the second coil group 20 are formed in a ring shape. However, the term "ring shape" referred to herein include not only the meaning of a complete ring shape but also the meaning of a partial ring shape (arc shape). Therefore, the coils included in the first coil group 10 and the second coil group 20 are not necessarily formed all around the center of rotation of the rotor 2. FIG. 5 is a diagram illustrating a modification of the first exciting coils 11 and 12 and the second exciting coils 21 and 22 that are provided to the stator 3. The coils 11, 12, 21, and 22 have a shape matching a partial annular area, and are formed at positions where the phases of the coils 11, 12, 21, and 22 agree with each other with reference to the magnetic pole pitch of the rotor 2.

The partial annular area means an area forming a part of an annular ring, the area being surrounded by two circles coaxial with the center of rotation of the rotor 2 and two straight lines passing through the center of rotation of the two circles. If an angle formed by the two straight lines is, for example, 90 degrees, four partial annular areas can be placed in the circumferential direction. The coils 11, 12, 21, and 22 illustrated in FIG. 5 are placed in one of such partial annular areas. Moreover, the coils 11, 12, 21, and 22 are formed by stacking coil patterns routed in each of four layers.

Coil patterns of the four layers illustrated in the top part of FIG. 5 are described. In a first layer (the first diagram from the left in the top part of FIG. 5), the outward coil of the first sine exciting coil 11 and the outward coil of the second sine exciting coil 21 are routed. On the other hand, in a second layer (the second left diagram in the top part of FIG. 5), the return coil of the first sine excitation coil 11 and the return coil of the second sine exciting coil 21 are routed. The outward coils and the return coils are connected to form the first sine exciting coil 11 and the second sine exciting coil 21 as illustrated in the middle part of FIG. 5.

Similarly, in a third layer (the third diagram from the left in the top part of FIG. 5), the outward coil of the first cosine exciting coil 12 and the outward coil of the second cosine exciting coil 22 are routed. On the other hand, in a fourth layer (the fourth diagram from the left in the top part of FIG. 5), the return coil of the first cosine exciting coil 12 and the return coil of the second cosine exciting coil 22 are routed. The outward coils and the return coils are connected to form the first cosine exciting coil 12 and the second cosine exciting coil 22 as illustrated in the middle part of FIG. 5.

The circumferential lengths of the coils 11, 12, 21, and 22 are simply required to be lengths that allow the formation of one magnetic pole pair (the north and south poles) at a minimum. The first exciting coils 11 and 12 and the second exciting coils 21 and 22 in the stator 3 are formed in a fan shape. As a result, it is possible to exert similar effects to those of the above embodiment and to realize space savings. Note that the first sine exciting coil 11 and the first cosine exciting coil 12 may be placed in such a manner as not to overlap with each other, or may be formed in the same plane (in the same layer).

Figure 6:
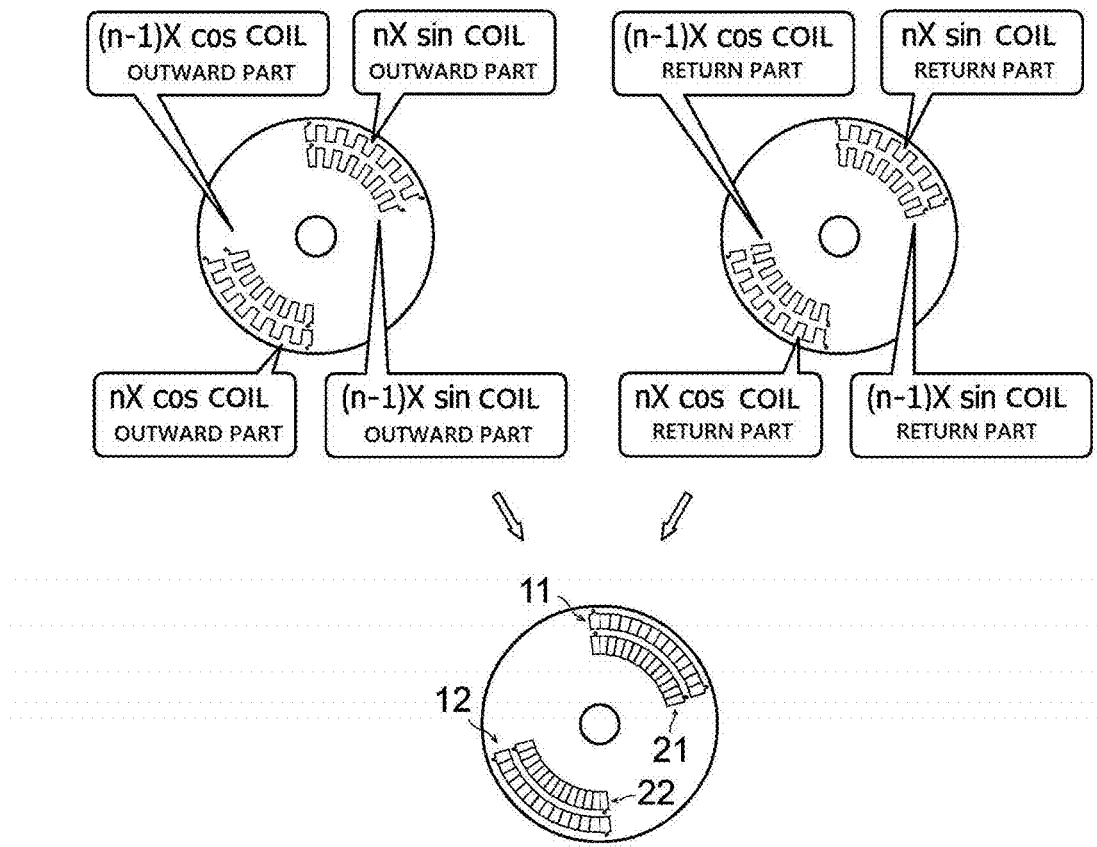
FIG. 6 is a front view of the stator illustrative of a coil shape as a modification.

Moreover, as illustrated in FIG. 6, the sine exciting coils 11 and 21 may be placed in one partial annular area, and the cosine exciting coils 12 and 22 may be placed in another partial annular area. Consequently, it is possible to place the sine exciting coils 11 and 21 and the cosine exciting coils 12 and 22 in the same plane and to have two layers as the number of layers of the board. Therefore, the number of layers can be reduced compared with the structure illustrated in FIG. 5. Note that these layers may be formed on one side of the board (single-sided double layer), or may be formed on two sides of one board.

2. Second Embodiment

Figure 7:
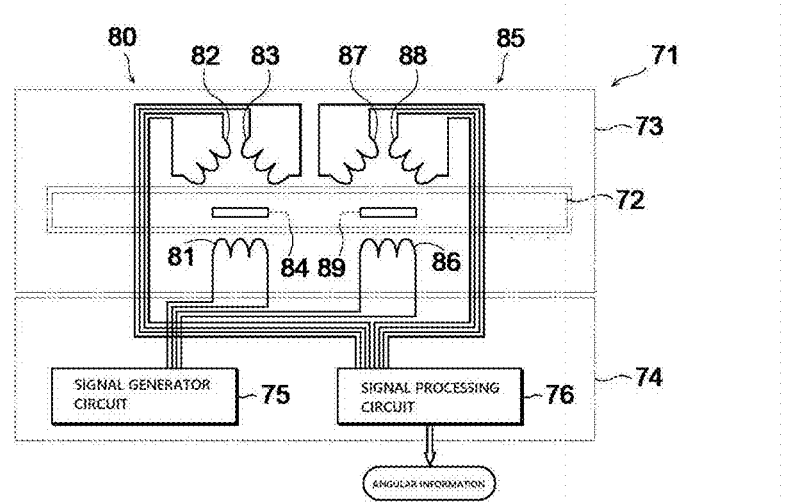
FIG. 7 is a schematic diagram illustrating the structure of a resolver as a second embodiment.

FIG. 7 is a schematic diagram illustrating the structure of a resolver 71 as a second embodiment. The resolver 71 is the single-phase excitation/two-phase output resolver 71, and is an inductive resolver (inductive sensor) that inputs an alternating current signal and detects the angle of rotation from amplitude modulated signals. The resolver 71 includes a rotor 72 (a rotor), a stator 73 (a stator), and a control device 74. The rotor 72 is a disc-shaped member that is pivotally supported in such a manner as to be rotatable relative to the stator 73. The stator 73 is a disc-shaped member that is fixed to an unillustrated casing. The stator 73 is provided with exciting coils 81 and 86 and detecting coils 82, 83, 87, and 88. On the other hand, the rotor 72 is provided with no coils, but is provided with conductors 84 and 89.

The control device 74 computes and outputs the angle of rotation of the rotor 72 relative to the stator 73. A signal generator circuit 75 that generates an alternating current signal that is supplied to the exciting coils 81 and 86, and a signal processing circuit 76 that outputs angular information corresponding to the angle of rotation on the basis of signals returned from the detecting coils 82, 83, 87, and 88 are incorporated in the control device 74. The alternating current signal generated in the signal generator circuit 75 is transmitted to the exciting coils 81 and 86 to form a predetermined magnetic field in the stator 73. In response to the generation of the magnetic field, eddy currents flow in the conductors 84 and 89 of the rotor 72, and a magnetic field that cancels the magnetic field of the stator 73 (a demagnetizing field) is generated to block the magnetic field. The positions of the conductors 84 and 89 of the rotor 72 change according to the angle of rotation. Hence, signals of which the amplitudes have been modulated in accordance with the angle of rotation are returned to the detecting coils 82, 83, 87, and 88 of the stator 73. The signals are inputted into the signal processing circuit 76.

The rotor 72 and the stator 73 of the resolver 71 illustrated in FIG. 7 are provided with a first coil group 80 and a second coil group 85. The first coil group 80 is a coil group including exciting and detecting coils having a multiplication factor of angle of n×. Contrarily, the second coil group 85 is a coil group including exciting and detecting coils having a multiplication factor of angle of (n−1)×. The first coil group 80 and the second coil group 85 are provided at positions that are different in the radial direction from each other. For example, the second coil group 85 is placed radially inward of the first coil group 80. Note that the second coil group 85 may be placed radially outward of the first coil group 80.

The exciting coils 81 and 86 (the first exciting coil 81 and the second exciting coil 86) are coils that generate a magnetic field in an axial direction in between with the first exciting coil 81 and the second exciting coil 86. The conductors 84 and 89 (the first conductor 84 and the second conductor 89) of the rotor 72 facing the stator 73 in the axial direction generate eddy currents therein in response to the magnetic fields of the exciting coils 81 and 86, and then generate demagnetizing fields that cancel the magnetic fields of the exciting coils 81 and 86. Hence, the conductors 84 and 89 block part of the magnetic fields of the exciting coils 81 and 86. For example, an alternating current signal with a predetermined amplitude is inputted into the exciting coils 81 and 86. It is configured in such a manner that the amplitude of the alternating current that is inputted into the exciting coils 81 and 86 can be changed under an instruction by the control device 74. The voltage value of the alternating current that is inputted into the exciting coils 81 and 86 is expressed as "sin $\omega_{ct}$". $\omega_{ct}$ is the angular velocity of the alternating current signal.

The detecting coils 82, 83, 87, and 88 detect the magnetic fields of the exciting coils 81 and 86. The conductors 84 and 89, which face the coils in the axial direction, of the rotor 72 move in the circumferential direction with the rotation of the rotor 72. Therefore, portions where the conductors 84 and 89 block the magnetic fields of the exciting coils 81 and 86 change according to the angle of the rotor. Therefore, the magnetic fields that are detected by the detecting coils 82, 83, 87, and 88 also change according to the angle of the rotor.

The detecting coils 82 and 83 of the first coil group 80 include the first sine detecting coil 82 and the first cosine detecting coil 83. Similarly, the detecting coils 87 and 88 of the second coil group 85 include the second sine detecting coil 87 and the second cosine detecting coil 88. The first sine detecting coil 82 and the second sine detecting coil 87 detect a sine of the angle of the rotor, and the first cosine detecting coil 83 and the second cosine detecting coil 88 detect a cosine of the angle of the rotor.

Let the angle of the rotor be θ. The voltage value of the alternating current signal obtained in the first sine detecting coil 82 having the multiplication factor of angle of n× is expressed as "sinn θ·sin $\omega_{ct}$". The voltage value of the alternating current signal obtained in the first cosine detecting coil 83 is expressed as "cosn θ·sin $\omega_{ct}$". Similarly, the voltage value of the alternating current signal obtained in the second sine detecting coil 87 having the multiplication factor of angle of (n−1)× is expressed as "sin(n−1)θ·sin $\omega_{ct}$". The voltage value of the alternating current signal obtained in the second cosine detecting coil 88 is expressed as "cos(n−1)θ·sin $\omega_{ct}$". In this manner, the amplitude of a modulated wave obtained in each of the detecting coils 82, 83, 87, and 88 changes according to a change in the angle θ of the rotor. Hence, the angle θ of the rotor, can be determined on the basis of the amplitudes. The signal detected in each of the detecting coils 82, 83, 87, and 88 is inputted into the control device 74.

Figure 8:
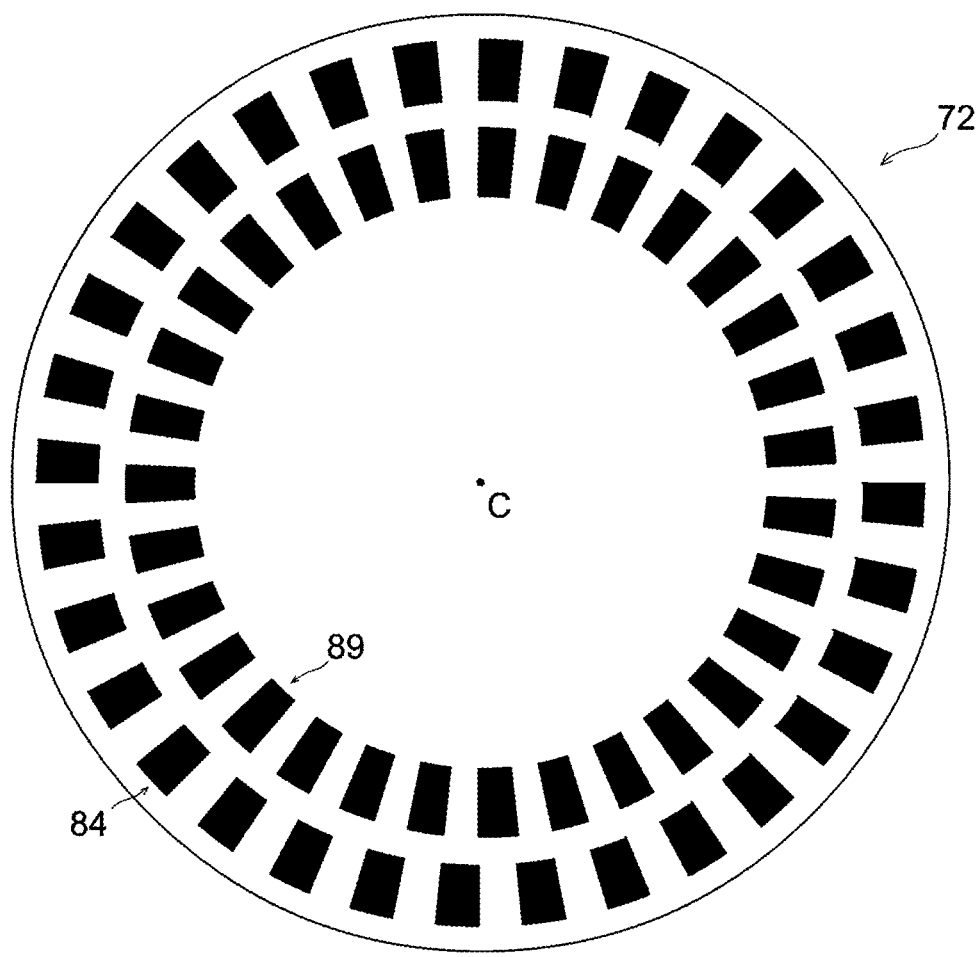
FIG. 8 is a front view illustrating the structure of a rotor of the resolver illustrated in FIG. 7.

FIG. 8 is a diagram illustrating a layout example of the conductors 84 and 89 provided to the rotor 72. The conductors 84 and 89 are formed in a shape of which the area influenced by the magnetic fields generated on the exciting coils 81 and 86 changes according to the angle of rotation of the rotor 72, or more specifically a shape obtained by dividing an annular ring into multiple pieces in the circumferential direction and removing alternate multiple divided disc pieces along the circumferential direction (a shape where every second disc piece is removed while alternate disc pieces remain). The first conductor 84 illustrated in FIG. 8 is a layout example in a case where the multiplication factor of angle is 32×. The first conductor 84 is placed in a layout where an annular ring is divided into 64 pieces in the circumferential direction and alternate pieces are removed, and is distributed and placed in a total of 32 places on a resin board. Moreover, the second conductor 89 illustrated in FIG. 8 has a multiplication factor of angle of 31× and therefore, is placed in a layout where an annular ring is divided into 62 pieces in the circumferential direction and alternate pieces are removed (in a layout where conductors are distributed and placed in 31 places at regular intervals in the circumferential direction). Note that the shape of each of the conductors 84 and 89 does not need to be "solidly shaded" as illustrated in FIG. 8, and may be, for example, a "closed ring shape that is enclosed only with an outline."

Figure 9:
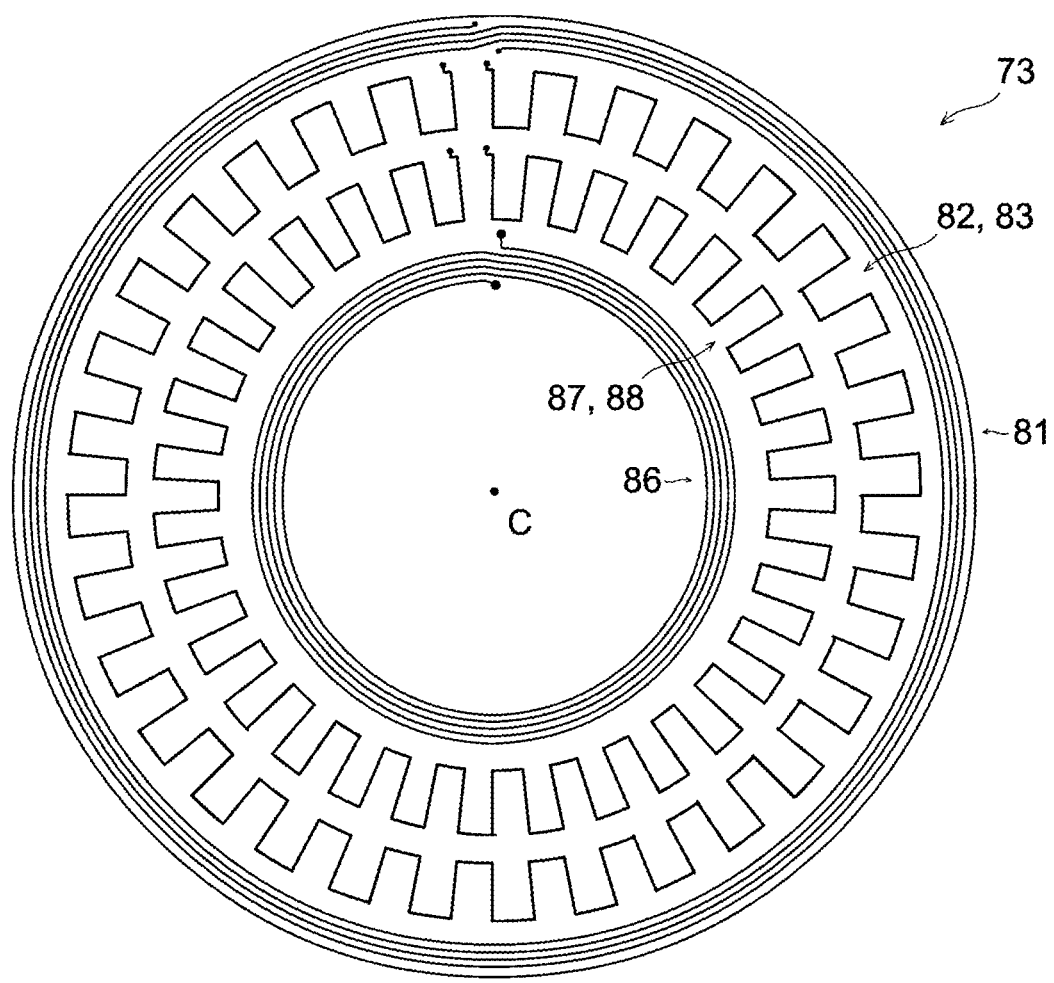
FIG. 9 is a front view illustrating the structure of a stator of the resolver illustrated in FIG. 7.

FIG. 9 is a diagram illustrating a layout example of the first exciting coil 81, the first sine detecting coil 82, the first cosine detecting coil 83, the second exciting coil 86, the second sine detecting coil 87, and the second cosine detecting coil 88, which are provided to the stator 73. Only one of the outward part and the return part of only one of the first sine detecting coil 82 and the first cosine detecting coil 83 is illustrated. Similarly, only one of the outward part and the return part of only one of the second sine detecting coil 87 and the second cosine detecting coil 88 is illustrated. Each of the first exciting coil 81, the first sine detecting coil 82, the first cosine detecting coil 83, the second exciting coil 86, the second sine detecting coil 87, and the second cosine detecting coil 88 is provided in a ring shape in such a manner as to surround a rotation axis C.

In the embodiment, the first exciting coil 81 is routed in a shape obtained by turning around several times on the outer peripheral side on a disc-shaped surface facing the rotor 72. On the other hand, the second exciting coil 86 is routed in a shape obtained by turning around several times on the inner peripheral side closer to the rotation axis C on the opposing surface. The exciting coils 81 and 86 are not necessarily coils dedicated to the first coil group 80 and the second coil group 85, respectively, but function collectively as one exciting coil. In an area outward of the first exciting coil 81 and in an area inward of the second exciting coil 86, magnetic fields that cancel each other are formed. On the other hand, in an area inward of the first exciting coil 81 and outward of the second exciting coil 86, magnetic fields that strengthen each other are formed. In this manner, the magnetic fields generated by the two exciting coils 81 and 86 are used by both of the first coil group 80 and the second coil group 85. Moreover, the detecting coils 82 and 83 of the first coil group 80 are placed on the outer peripheral side of the annular area surrounded by the first exciting coil 81 and the second exciting coil 86. On the other hand, the detecting coils 87 and 88 of the second coil group 85 are placed on the inner peripheral side of the annular area.

As illustrated in FIG. 9, the first sine detecting coil 82 and the first cosine detecting coil 83 are placed in a layout similar to the layout of the first sine exciting coil 11 and the first cosine exciting coil 12 of the first embodiment. In other words, each of the first sine detecting coil 82 and the first cosine detecting coil 83 is formed in a shape obtained by placing a rectangular wave along the circumference of a circle coaxial with the center of rotation of the rotor 72, on the surface, which faces the rotor 72, of the stator 73. Each of the first sine detecting coil 82 and the first cosine detecting coil 83 has a shape where the n magnetic pole pairs are alternately placed in the circumference. Note that the first sine detecting coil 82 and the first cosine detecting coil 83 may be placed on top of each other on one side surface of a base, or may be placed on the front and back sides of the base. Moreover, the outward coil and the return coil of each of the first sine detecting coil 82 and the first cosine detecting coil 83 may be placed on top of each other in two layers on one side surface of the base, or may be placed separately on two side surfaces of the base.

The second sine detecting coil 87 and the second cosine detecting coil 88 are provided inside the first sine detecting coil 82 and the first cosine detecting coil 83. The second sine detecting coil 87 and the second cosine detecting coil 88 are placed in a layout similar to the layout of the second sine exciting coil 21 and the second cosine exciting coil 22 of the first embodiment. In other words, each of the second sine detecting coil 87 and the second cosine detecting coil 88 is formed in a shape obtained by placing a rectangular wave along the circumference of a circle coaxial with the center of rotation of the rotor 72, on the surface, which faces the rotor 72, of the stator 73. Each of the second sine detecting coil 87 and the second cosine detecting coil 88 has a shape where (n−1) magnetic pole pairs are alternately placed in the circumferential direction. Note that the second sine detecting coil 87 and the second cosine detecting coil 88 may be placed on top of each other on one side surface of the base, or may be distributed and placed on the front and back sides of the base. Moreover, the outward coil and the return coil of each of the second sine detecting coil 87 and the second cosine detecting coil 88 may be placed on top of each other in two layers on one side surface of the base, or may be placed separately on two side surfaces of the base.

The resolver 71 of the second embodiment is provided with the first coil group 80 and the second coil group 85 as illustrated in FIGS. 7 to 9. The first coil group 80 has the multiplication factor of angle of n×(where n is a natural number equal to or greater than three), is placed coaxially with the axis of rotation of the rotor 72, and also includes the first exciting coil 81 and the first detecting coils 82 and 83, each of which is formed in a ring shape. Moreover, the second coil group 85 has the multiplication factor of angle of (n−1)×, is placed coaxially with the axis of rotation of the rotor 72, and also includes the second exciting coil 86 and the second detecting coils 87 and 88, each of which is formed in a ring shape. Moreover, the first coil group 80 and the second coil group 85 are provided at positions that are different in the radial direction from each other.

With such a configuration, as in the first embodiment, alternating current signals obtained via the coils of the two systems that are different in the multiplication factor of angle by 1× can be acquired, and information on a phase difference can be caused to correspond one-to-one to the absolute angle of the rotor 72. Therefore, the capability of detecting the angle of rotation can be improved with a simple configuration by use of the vernier principle. Moreover, multi-pole coils are used instead of coils having the multiplication factor of angle of 1×, which makes it possible to be resistant to the influence of an external magnetic field. Consequently, it is possible to increase immunity to magnetic noise and prevent an increase in detection error. Moreover, the first coil group 80 and the second coil group 85 are provided at the positions that are different in the radial direction from each other. As a result, they can be placed in the same plane. Furthermore, a magnetic pole size difference can be reduced as compared to a case where a coil having the multiplication factor of angle of n× and a coil of the multiplication factor of angle of 1× are used. Consequently, the magnetic coupling of the exciting coils and the detecting coils can be made substantially uniform. Note that, as in the first embodiment, upon setting the coil shapes of the first detecting coils 82 and 83 and the second detecting coils 87 and 88, such coil shapes as illustrated in FIGS. 5 and 6 may be applied.

DESCRIPTION OF REFERENCE SIGNS

- 1, 71 Resolver
- 2, 72 Rotor
- 3, 73 Stator
- 4, 74 Control device
- 5, 75 Signal generator circuit
- 6, 76 Signal processing circuit
- 7, 8 Base
- 10 First coil group
- 11 First sine exciting coil (first exciting coil, sine exciting coil)
- 12 First cosine exciting coil (first exciting coil, cosine exciting coil)
- 13 First detecting coil (detecting coil)
- 14 First transmission antenna coil
- 15 First receiving antenna coil
- 20 Second coil group
- 21 Second sine exciting coil (second exciting coil, sine exciting coil)
- 22 Second cosine exciting coil (second exciting coil, cosine exciting coil)
- 23 Second detecting coil (detecting coil)
- 24 Second transmission antenna coil
- 25 Second receiving antenna coil
- 80 First coil group
- 81 First exciting coil
- 82 First sine detecting coil (first detecting coil)
- 83 First cosine detecting coil (first detecting coil)
- 84 First conductor
- 85 Second coil group
- 86 Second exciting coil
- 87 Second sine detecting coil (second detecting coil)
- 88 Second cosine detecting coil (second detecting coil)
- 89 Second conductor

The invention claimed is:

1. A resolver that detects an angle of rotation of a rotor relative to a stator, the resolver comprising:
    a first coil group including a first exciting coil and a first detecting coil that have a multiplication factor of angle of n×(where n is a natural number equal to or greater than three), are placed coaxially with an axis of rotation of the rotor, and each have a ring shape; and
    a second coil group including a second exciting coil and a second detecting coil that have a multiplication factor of angle of (n−1)×, are placed coaxially with the axis of rotation of the rotor, and each have a ring shape, wherein
    the first coil group and the second coil group are provided at positions different in a radial direction from each other.

2. The resolver according to claim 1, wherein
    each of the first coil group and the second coil group is formed in a sheet shape, and
    the second coil group is placed radially inward of the first coil group.

3. The resolver according to claim 2, wherein a radial dimension of an area where the second coil group is placed is greater than a radial dimension of an area where the first coil group is placed.

4. The resolver according to claim 1, wherein
    the stator is provided with the first exciting coil and the first detecting coil of the first coil group and the second exciting coil and the second detecting coil of the second coil group, and
    the rotor includes a first conductor configured to generate a demagnetizing field at a magnitude in accordance with the angle of rotation in a direction in which a magnetic field of the first exciting coil is cancelled, and a second conductor configured to generate a demagnetizing field at a magnitude in accordance with the angle of rotation in a direction in which a magnetic field of the second exciting coil is cancelled.

5. The resolver according to claim 4, wherein each of the first detecting coil and the second detecting coil includes a sine detecting coil provided to the stator, the sine detecting coil being configured to detect a first signal corresponding to an amplitude modulated sine wave, and a cosine detecting coil provided to the stator, the cosine detecting coil being configured to detect a second signal corresponding to an amplitude modulated cosine wave.

6. The resolver according to claim 1, wherein
    the first exciting coil and the first detecting coil of the first coil group are placed, facing each other, in the rotor and the stator, and
    the second exciting coil and the second detecting coil of the second coil group are placed, facing each other, in the rotor and the stator.

7. The resolver according to claim 6, wherein each of the first coil group and the second coil group includes a sine exciting coil provided to the stator, the sine exciting coil being configured to be excited by a first signal corresponding to an amplitude modulated sine wave, a cosine exciting coil provided to the stator, the cosine exciting coil being configured to be excited by a second signal corresponding to an amplitude modulated cosine wave, and a detecting coil provided to the rotor, the detecting coil being configured to output a modulated wave including a phase shift in accordance with the angle of rotation.

* * * * *